Oct. 20, 1942.                H. E. GOETZ                2,299,087
                DEVICE FOR ALIGNING AUTOMOBILE WHEELS
                        Filed March 25, 1941
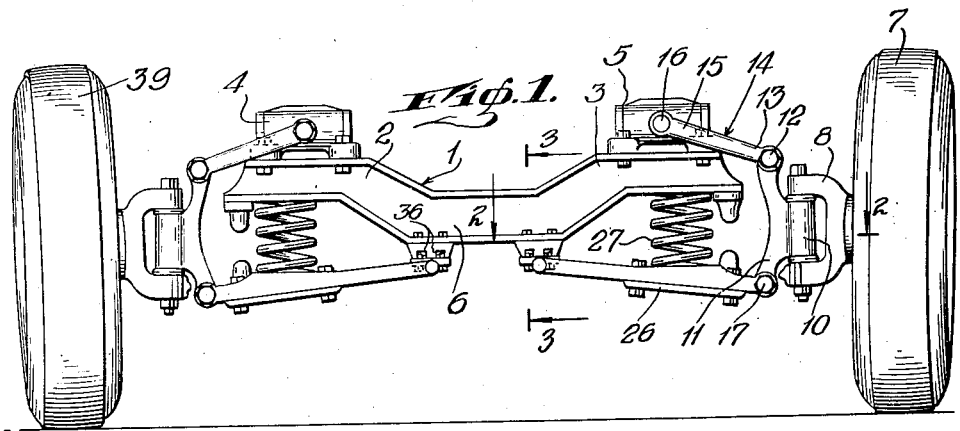
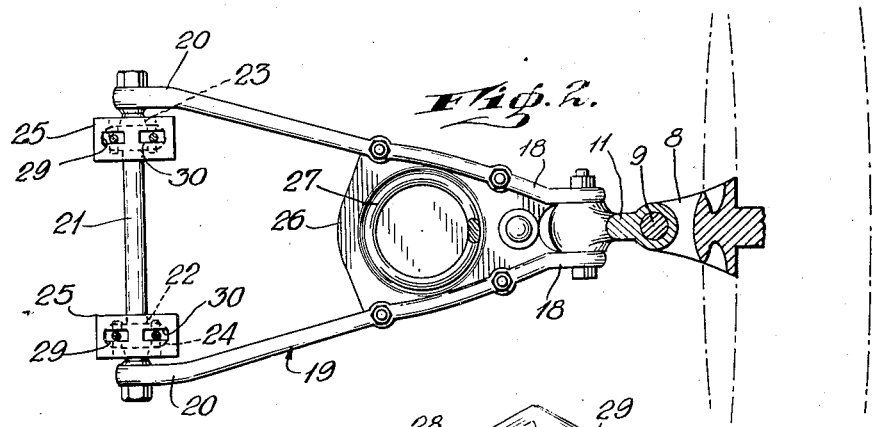
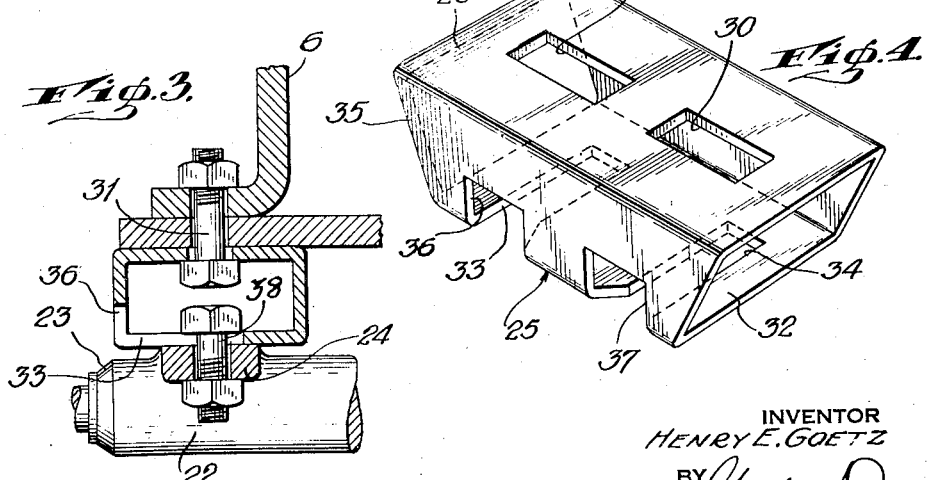
INVENTOR
HENRY E. GOETZ
BY
ATTORNEY Patented Oct. 20, 1942

2,299,087

UNITED STATES PATENT OFFICE 2,299,087

DEVICE FOR ALIGNING AUTOMOBILE WHEELS

Henry E. Goetz, Brooklyn, N. Y.

Application March 25, 1941, Serial No. 385,205

10 Claims. (Cl. 280—124)

This invention relates to devices for acquiring the desired camber angle of knee action equipped automobile wheels and, in turn, the desired caster angle of the king pin of automobile wheels.

With one type of knee action automobile wheels, each steering wheel of a pair is mounted independently yieldable relative to the chassis, including an upper control arm, a lower control arm, a bracket pivotally mounted on the king pin of the automobile wheel with the upper control arm pivotally connected at one end to the upper end of the pivotally mounted bracket and with the upper end of the upper control arm pivotally connected to the upper portion of the chassis, the lower control arm pivotally connected at one end to the lower end of the pivotally mounted bracket and the other end of the lower control arm pivotally connected to the lower portion of the chassis with a bump or shock absorbing spring interposed between the lower control arm and the lower face of the chassis. With wear and tear on the several parts and particularly on the intervening spring, as an instance after 5000 miles of travel, the camber and caster inclination of the original adjustment may become materially changed.

Among the objects of the present invention, it is aimed to provide an improved device or mechanism for correcting such maladjusted camber and caster inclination and, in turn, to facilitate correcting such maladjustment.

These and other features, capabilities and advantages of the invention will appear from the subjoined detail description of one particular specific embodiment thereof illustrated in the accompanying drawing in which:

Fig. 1 is a front elevation of the control mechanism of a pair of knee action mounted automobile wheels equipped with the present invention;

Fig. 2 is a section on the line 2—2 of Fig. 1;

Fig. 3 is a section on the line 3—3 of Fig. 1; and

Fig. 4 is a perspective of a bracket constituting the main part of the present invention.

In the present invention, the cross member 1 of the front portion of the chassis of an automobile is shown having mounted on the upper faces of its end portions 2 and 3, the bearings 4 and 5, respectively. The end portions 2 and 3 of the cross section are raised relative to the intermediate portion 6.

The control elements of the wheel 7 in their relation to the present invention will now be described.

The wheel 7 is provided with the usual king pin bracket 8 for receiving the king pin 9 on which is pivotally mounted the bushing 10 of the connecting knuckle support 11. The upper end of the knuckle support 11 is pivotally connected at the pivotal point 12 to the outer bifurcated end portion 13 of the upper control arm 14. The other bifurcated end portion 15 of the upper control arm 14 is pivotally connected at the pivotal point 16 to the bearing 5. The lower end portion of the knuckle support 11 is pivotally connected at 17 to the outer bifurcated end portions 18 of the lower control arm 19. The inner bifurcated end portions 20 of the lower control arm 19 are pivotally mounted on the pivot shaft 21 provided with the end portions 22, 23, the end portion 22 having ears 24 provided with bolt receiving orifices, and the end portion 23 having similar ears 24 provided with bolt receiving orifices.

When the adjusting bracket 25, illustrated in Fig. 4, is not in use, that is, before correction for camber and/or caster is required, then the orifices in the ears 24 adjacent each of the end portions 22 and 23 register with bolt receiving openings in the intermediate portion 6 of the cross member 1 to receive bolts, not shown, for connecting the ears 24 directly to the intermediate portion 6 of the cross member 1.

The lower control arm 19 intermediate its bifurcated elements is provided with a platform 26 having a depression constituting a seat for the shock absorbing spring 27 interposed between said platform 26 and a similar depression in the lower face of the end portion 3 of the cross member 1. Without the bracket 25, hereinafter to be described, the tension of the spring 27 and the relative lengths of the control arms 14, 19, knuckle support 11 and associated parts as initially assembled cooperate with one another to produce a predetermined camber and caster inclination. After wear and tear on the several parts, such as the connections for the control arms 14, 19, knuckle support 11 and associated devices and particularly wear and tear on the spring 27, the initial prescribed camber and caster inclination will be changed with consequent impairment of proper traction, uniform wear on the tire and the like. Several corrections must then regularly be made, sometimes even including toe-in and king pin inclination corrections.

The present invention, however, is mainly concerned with caster and camber corrections and particularly with a view to achieving both corrections by one and the same device. This device consists essentially of the bracket 25, shown in Fig. 4, which is preferably composed of a flat tubular stock, rectangular in cross section, as shown, having outside dimensions of about 4″x2″x1″ relative to its transverse cross section and about ⅛″ in thickness of a suitable malleable iron casting, steel tubing or the like.

The upper wall 28, from the standpoint of use in the present instance, is preferably provided with two elongated slots 29 and 30 in alinement with one another and suitable for receiving bolts, such as bolts 31 shown in Fig. 3. The slots 29 and 30 are positioned to receive two bolts 31 extending through a pair of bolt receiving openings in the intermediate portion 6 of the cross member 1 and facilitate slidably adjusting the bracket 25 relative to the cross member 1. In addition, each bracket 25 also has in its lower wall 32 relative to the upper wall 28, from the standpoint of use in the present instance, two transversely extending slots 33 and 34. Since the walls 28 and 32 are preferably parallel to one another, it is also preferable to have the slots 33, 34 intersect in part imaginary rectangular prisms extending vertical to the wall 28 and co-extensive with the openings 29 and 30 in cross section. Preferably, also as shown in Fig. 4, at least the slots 33 and 34 must extend to the outer edge of the wall in which they are located and in the case of the wall 32 extend up into the side wall 35. The portions 36 and 37 of the slots 33 and 34 in the side wall 35 are preferably wider than the slots 33 and 34, the ends of the slots 33 and 34 adjacent the wall 35 flaring outwardly into the greater widths of the slot portions 36 and 37 in order to facilitate affording access for the bolts in the assembly and adjustment of the bracket 25 from time to time.

In actual use, the bolts 31 are passed through the slots 29 and 30 and orifices in the intermediate portion 6 and slidably moved along the slots 29 and 30 until the desired camber inclination is achieved when the bolts 31 are secured in place. Thereupon if caster correction is also required, the bolts 38 are passed through the slots 33 and 34 and then into the orifices in the ears 24 of the end portions 22 and 23 and the bifurcated end portions 20 of the lower control arm 19 moved forwardly or rearwardly relative to the brackets 25. It is, of course, understood that ordinarily it will be preferable to use two brackets, one for each end portion 22, 23, as shown in Fig. 2.

The control elements for the wheel 39 are substantially identical to those for the wheel 7 and therefore it is assumed that the detailed description aforesaid of the control elements for the wheel 7 will suffice.

It is obvious that various changes and modifications may be made to the details of construction without departing from the general spirit and scope of the invention as set forth in the appended claims.

I claim:

1. An adjustment device for the knee action control mechanism of an automobile wheel intermediate the front cross member of the chassis of an automobile and the lower control arm of the control mechanism including a bracket having two spaced apart walls, there being alined bolt receiving openings in one wall and parallel bolt receiving openings in the other wall of said bracket, the parallel bolt receiving openings extending in a direction transverse to that of the alined openings, one pair of bolt receiving openings adjustably registering with bolt receiving openings in the cross member of the chassis to receive bolts for securing the bracket to the chassis in the position determined to suit the adjustment selected and the other bolt receiving openings adjustably registering with bolt receiving openings in the lower control arm to receive bolts for securing the lower control arm to said bracket in the position determined to suit the adjustment selected.

2. An adjustment device for the knee action control mechanism of an automobile wheel intermediate the front cross member of the chassis of an automobile and the lower control arm of the control mechanism including a bracket having two spaced apart walls, means for adjustably securing one of said walls of the bracket to said lower control arm, there being alined bolt receiving openings in the other wall adjustably registering with bolt receiving openings in the cross member of the chassis extending in a line toward the adjacent wheel to receive bolts for securing the bracket to said cross member in the position determined to suit the adjustment selected.

3. An adjustment device for the knee action control mechanism of an automobile wheel intermediate the front cross member of the chassis of an automobile and the lower control arm of the control mechanism including a bracket having two spaced apart walls, means for adjustably securing one of said walls of the bracket to said cross member, there being parallel bolt receiving openings in the other wall adjustably registering with bolt receiving openings in the lower control arm to receive bolts for securing the lower control arm to the bracket in the position determined to suit the adjustment selected.

4. An adjustment device for the knee action control mechanism of an automobile wheel intermediate the front cross member of the chassis of an automobile and the lower control arm of the control mechanism including a bracket consisting of a malleable iron casting or the like having two spaced apart walls, there being alined bolt receiving openings in one wall and parallel bolt receiving openings in the other wall of said bracket, the parallel bolt receiving openings extending in a direction transverse to that of the alined openings, one pair of bolt receiving openings adjustably registering with bolt receiving openings in the cross member of the chassis to receive bolts for securing the bracket to the chassis in the position determined to suit the adjustment selected and the other bolt receiving openings adjustably registering with bolt receiving openings in the lower control arm to receive bolts for securing the lower control arm to said bracket in the position determined to suit the adjustment selected.

5. An adjustment device for the knee action control mechanism of each front automobile wheel intermediate the front cross member of the chassis of an automobile and the lower control arm of the control mechanism including a bracket having two spaced apart walls, means for adjustably securing one of said walls of the bracket to said lower control arm, there being alined bolt receiving openings in the other wall adjustably registering with bolt receiving openings in the cross member of the chassis extending in a line toward the adjacent wheel to receive bolts for securing the bracket to said cross member in the position determined to suit the adjustment selected.

6. An adjustment device for the knee action control mechanism of each front automobile wheel intermediate the front cross member of the chassis of an automobile and the lower control arm of the control mechanism including a bracket having two spaced apart walls, means for adjustably securing one of said walls of the bracket to said cross member, there being parallel bolt receiving openings in the other wall adjustably registering with bolt receiving openings in the lower control arm to receive bolts for securing the lower control arm to the bracket in the position determined to suit the adjustment selected.

7. An adjustment device for the knee action control mechanism of an automobile wheel interposed intermediate the front cross member of the chassis of an automobile and the lower control arm of the mechanism, the lower control arm having inner and outer bifurcated ends, the bifurcated ends being normally pivotally connected to the lower face of the cross member and the outer bifurcated ends being pivotally connected to the king pin of its adjacent automobile wheel, said device consisting of a bracket having two spaced apart walls interposed between each bifurcated inner end of said lower control arm and the lower face of said cross member, there being alined bolt receiving openings in one wall and parallel bolt receiving openings in the other wall of said bracket, the parallel bolt receiving openings extending in a direction transverse to that of the alined openings, one pair of bolt receiving openings adjustably registering with bolt receiving openings in the cross member of the chassis to receive bolts for securing the bracket to the chassis in the position determined to suit the adjustment selected and the other bolt receiving openings adjustably registering with bolt receiving openings in the lower control arm to receive bolts for securing the lower control arm of the bracket in the position determined to suit the adjustment selected.

8. An adjustment device for the knee action control mechanism of an automobile wheel interposed intermediate the front cross member of the chassis of an automobile and the lower control arm of the mechanism, the lower control arm having inner and outer bifurcated ends, the inner bifurcated ends being normally pivotally connected to the lower face of the cross member and the outer bifurcated ends being pivotally connected to the king pin of its adjacent automobile wheel, said device consisting of brackets each having two spaced apart walls, each bracket interposed between one bifurcated inner end of said lower control arm and the lower face of said cross member, means for adjustably securing one of said walls of said brackets to the bifurcated ends of said lower control arm, there being alined bolt receiving openings in one wall of each of said brackets adjustably registering with bolt receiving openings in the cross member of the chassis, each set of alined bolt receiving openings extending in a line toward the adjacent wheel to receive bolts for securing said bracket to said cross member in the position determined to suit the adjustment selected.

9. An adjustment device for the knee action control mechanism of an automobile wheel interposed intermediate the front cross member of the chassis of an automobile and the lower control arm of the mechanism, the lower control arm having inner and outer bifurcated ends, the inner bifurcated ends being normally pivotally connected to the lower face of the cross member and the outer bifurcated ends being pivotally connected to the knuckle support of the king pin of its adjacent automobile wheel, said device consisting of brackets each having two spaced apart walls, each bracket interposed between one bifurcated inner end of said lower control arm and the lower face of said cross member, means for adjustably securing one of said walls of said bracket to said cross member, there being parallel bolt receiving openings in one wall of each bracket adjustably registering with bolt receiving openings in one bifurcated end of a lower control arm to receive bolts for receiving such bifurcated end of a lower control arm to said bracket in the position determined to suit the adjustment selected.

10. An adjustable device for the knee action control mechanism of an automobile wheel intermediate the front cross member of the chassis of an automobile and the lower control arm of the control mechanism including a bracket having two spaced apart walls, means for adjustably securing one of said walls of said bracket to said lower control arm, and means for adjustably securing the other of said walls of said bracket to said cross member, the separate walls facilitating adjustments that are independent and of different character one to the other without interfering with one another.

HENRY E. GOETZ.